Dec. 30, 1958  F. McMILLEN  2,866,881
TEMPERATURE CONTROLLED ELECTRICALLY HEATED
WINDOW AND WINDOW WIPER SYSTEM
Filed Dec. 19, 1955  3 Sheets-Sheet 1

INVENTOR.
Foster McMillen
BY
ATTORNEY

Dec. 30, 1958 F. McMILLEN 2,866,881
TEMPERATURE CONTROLLED ELECTRICALLY HEATED
WINDOW AND WINDOW WIPER SYSTEM
Filed Dec. 19, 1955 3 Sheets-Sheet 2
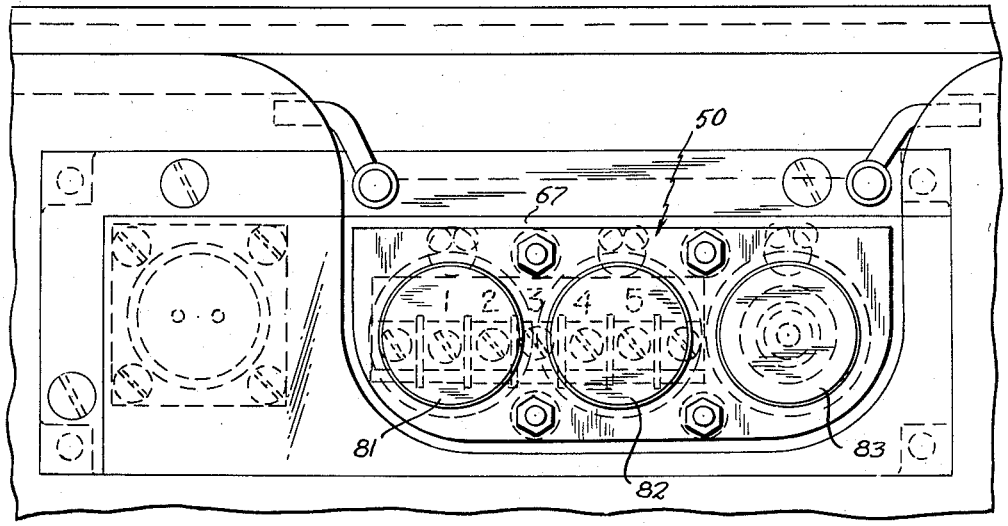
FIG. 8
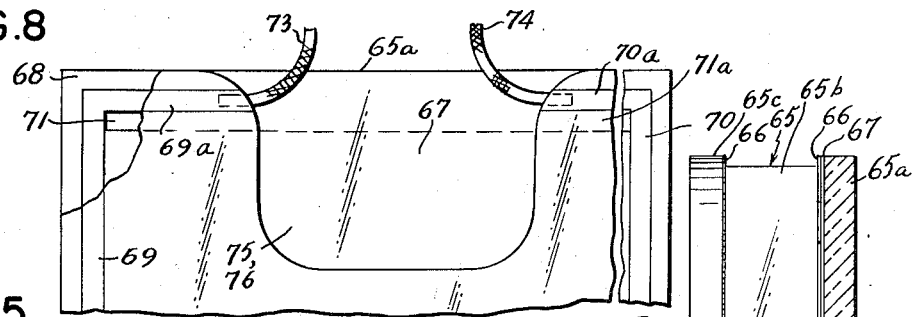
FIG. 5
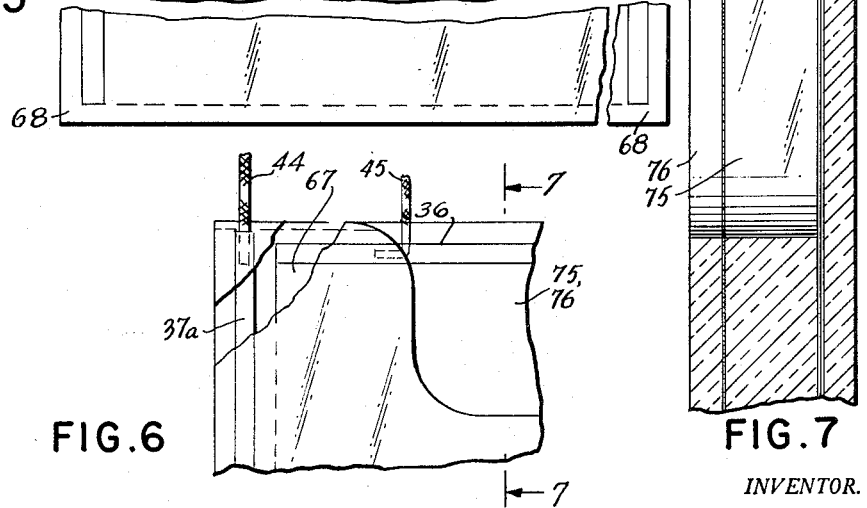
FIG. 6
FIG. 7
INVENTOR.
Foster McMillen
BY
ATTORNEY

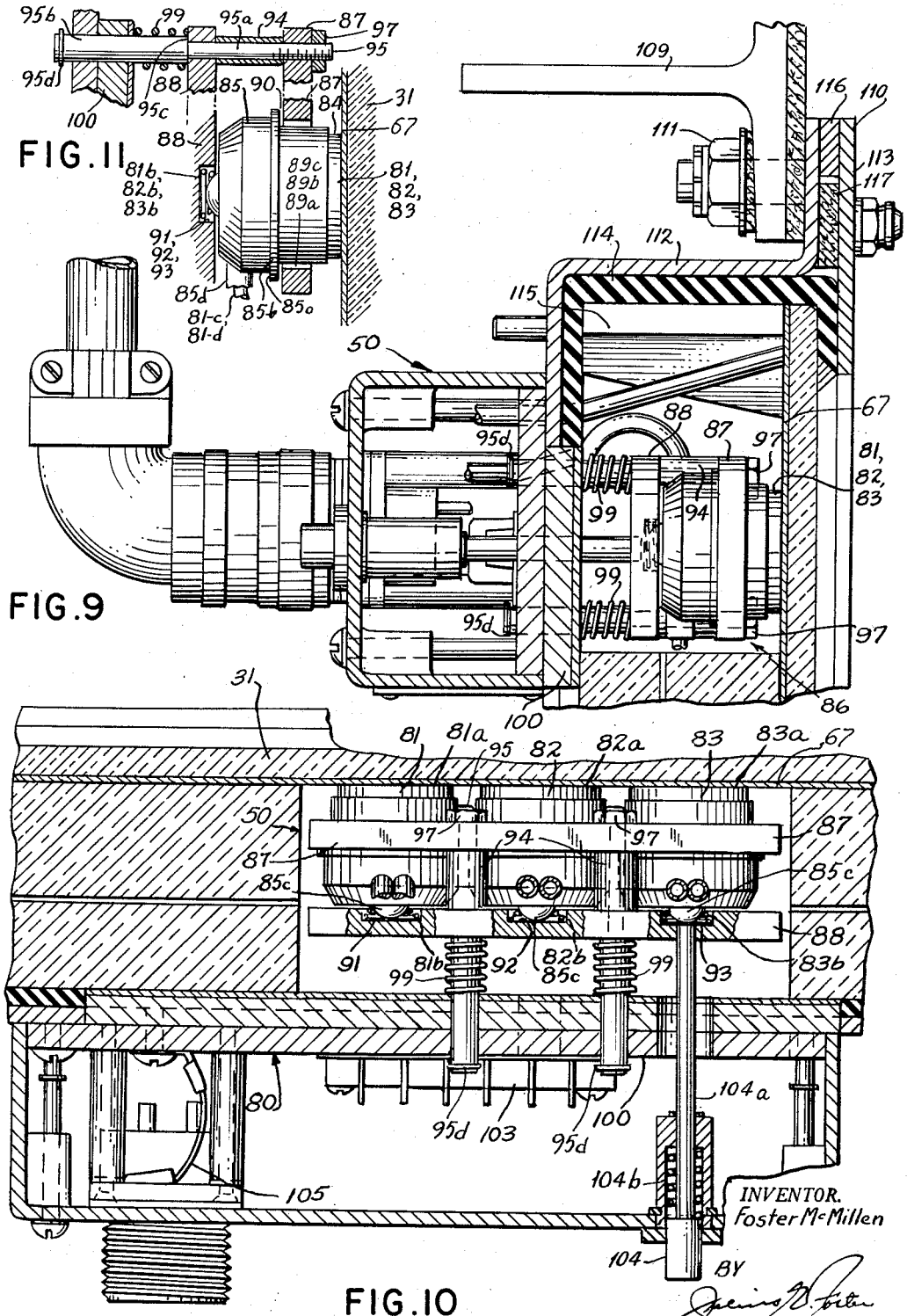

United States Patent Office 2,866,881
Patented Dec. 30, 1958

2,866,881

TEMPERATURE CONTROLLED ELECTRICALLY HEATED WINDOW AND WINDOW WIPER SYSTEM

Foster McMillen, Staten Island, N. Y., assignor to Kearfott Company, Inc., Little Falls, N. J., a corporation of New York Application December 19, 1955, Serial No. 553,883

4 Claims. (Cl. 219—19)

This invention relates to thermostatically controlled electrically heated windows, and to systems including such heated windows and heated wipers therefor.

One specific application for the use of such windows is illustrated herein as on sea-going vessels, for example, where the pilot house, or navigation bridge, or other observation place, may be closed, or enclosed, with walls containing one or more transparent windows which are to provide an unobstructed view for observation purposes.

Such vessels, when traversing the arctic or antarctic regions, may encounter a wide range of climatic conditions and temperatures, frequently below freezing temperature. The front or exposed surface of the outer window panel must be kept clear for visual observations, and must therefore be kept free of any obstructions, such as moisture, snow or ice, in order to be of service.

Customarily, a window wiper is employed to wipe a selected area on the front exposed surface of the window panel. The wiping action can be accomplished satisfactorily to remove moisture, such as might result from fog or rain, or even to remove soft snow, so long as the temperature on the exposed surface of the window panel is above the freezing point.

However, when the ambient temperature drops to or below the freezing point, any moisture that collects on the front surface of the window panel may freeze and change to hard snow or ice, which would then stick to the window panel in spite of the operation of the wiping device. Moreover, under gale conditions, at low temperatures, the ocean spray freezes and accumulates at a fast rate, known to have reached as much as thirty inches of ice per hour.

It is therefore a primary object of this invention to provide a window construction in which the glass panel with the exposed surface is electrically heated and regulated, through suitable thermostatic controls, to maintain the temperature of the front exposed surface of the window above the freezing point of water or of the ocean spray, in order thereby to prevent the formation and accumulation of snow and ice on such front exposed surface of the window panel.

Another object of this invention is to provide a heated window construction which utilizes an integral transparent electro-conducting film on the rear surface of the exposed or front glass panel of the window, to provide the heating energy necessary to maintain the temperature at the front exposed surface above the freezing point.

Another object of the invention is to provide a heated window assembly in which a structural glass panel is disposed behind the electrically heated front panel, to serve as a transparent insulating cover for the rear of the electrically heated window pane, and to serve additionally as a heat stop and reflector, to confine the electrically generated heat and to direct the heat to the exposed window panel.

Another object of the invention is to provide a window assembly for such low temperature use, in which the exposed glass panel surface is heated and an associated window wiper is heated to assure the existence of a temperature above freezing at each increment of the area of the wiping region on the window as swept by the wiper blade.

The details of construction and the manner of operation of a heated window and wiper assembly, embodying the invention described herein, are shown in the accompanied drawings, in which.

Figure 3:
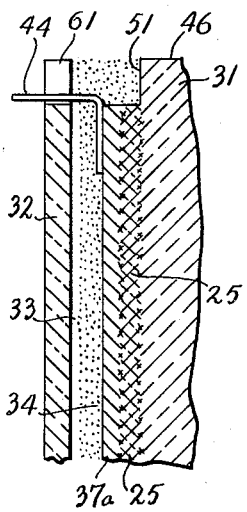
Figure 12:
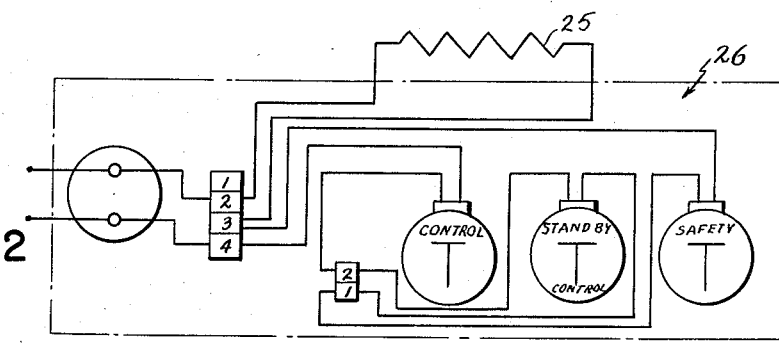
Figure 4:
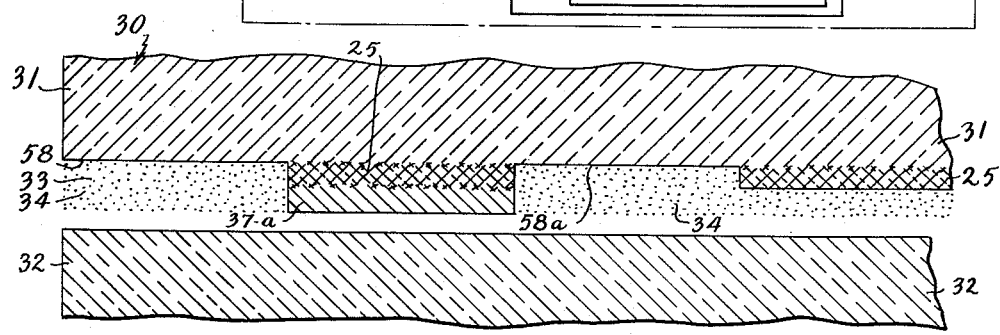
Figure 2:
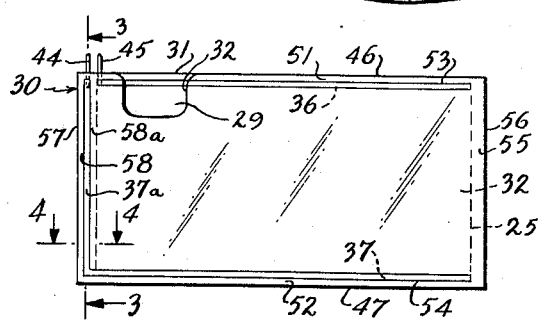
Figure 2 is a rear elevation of a heated window assembly of this invention and shows the bus-bar borders of the electro-conductive film, and the cut-out space to accommodate a control thermostat assembly.

Figures 3 and 4 are sections taken along lines 3—3 and 4—4 of Figure 2, and are shown enlarged with the panels arbitrarily separated to show how and where the cement is disposed and where the film is decoated from the front glass panel to leave a conducting strip which is then covered by low-resistivity metal;

Figures 5 and 6 show different arrangements of bus terminals in two window assemblies;

Figure 7 is a section along lines 7—7 of Figure 6;

Figure 8 is an elevational view at the rear of a window to show the thermostat location;

Figure 9 is an end elevation, partially in section, across the window assembly and thermostat;

Figure 10 is a plan view partially in section, of the thermostat assembly and the region of the adjacent glass window assembly;

Figure 11 is a side elevation partially in section, and with parts broken away, to show the details of construction and the disposition of one thermostat unit and the supporting bracket therefor; and Figure 12 is a diagrammatic view of the circuit and thermostats for supplying electrical energy to the heating film of the front panel.

Figure 1:
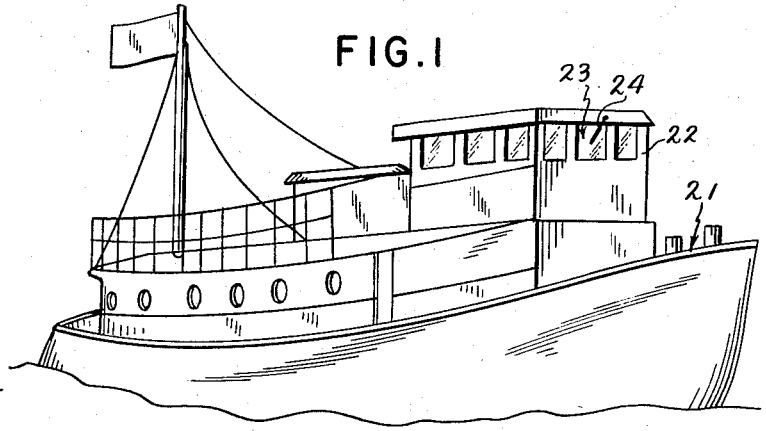
Figure 1 is a perspective view of a vessel with a pilot house having an observation window provided with a wiper to keep the window clear.

As shown schematically in Figure 1, a sea-going vessel 21 is provided with a pilot house, or navigation bridge, or equivalent enclosed observation space 22, shown with an observation window assembly 23 provided with a window wiper 24 to keep a selected area of the exposed window surface free and clear of any covering or clouding material, in order that full visibility may be had for observation through the window. A window wiper is ordinarily adequate where only moisture, as from fog or rain, tends to cover the front surface of the window, at temperatures above freezing. However, where temperatures below freezing are encountered, the moisture or rain quickly hardens and turns to snow and ice, which cannot be readily removed solely by the mechanical action of the wiper.

In such climates where temperatures below freezing will be encountered, the front or exposed surface of the window panel must be kept at a temperature above freezing, to prevent formation and accumulation of snow or ice that could not be removed solely by mechanical action of a wiper acting alone. To maintain such temperature above the freezing point on the front surface of the exposed window panel, the panel herein is provided with an electro-conductive film 25 constituting an integral part of the back surface of the front panel, and such film 25 is electrically energized to serve as a heating element to keep the body of the front glass panel heated.

The heat thus supplied to the front panel is suitably controlled to keep the temperature at the exposed front surface sufficient to prevent hardening of any moisture or snow on such exposed front surface. The mechanical action of the wiper is then effectively sufficient to wipe and clear such front surface of the front glass panel.

A thermostat control assembly, later described and identified as assembly 50, is employed to control the supply of heating energy to the electro-conductive film 25 to maintain the temperature of the front exposed surface of the window panel at or above a desired level.

Figure 2 shows a rear elevational view of a window panel assembly 30 with a space 29 provided by removal of a portion of the rear panel to accommodate the thermostatic control unit to be mounted thereon. Figure 3 shows an end elevation of the assembly of Figure 2.

Figure 4 shows a greatly enlarged sectional view of a portion of the window assembly, taken along line 4—4 in the direction of the arrows, at the left-hand edge of the window assembly in Figure 2.

As shown in Figures 2, 3 and 4, the window panel assembly 30 includes a front glass panel 31, a rear glass panel 32 separated from the back of the front panel 31 by a short distance or space 33. Such space 33 is completely filled with a sandwiched layer 34 of a transparent vinyl organic cementing sheet.

The rear surface of the front glass panel 31 is originally treated during manufacture to embody the previously mentioned integral transparent electro-conductive film 25. Two opposite border edge strips of the electro-conductive layer 25 are subsequently covered by superimposed metallic layer strips 36 and 37, as by deposition, for example, to serve as low-resistance bus-bars to conduct a substantial heating current from an external supply circuit and to distribute such current evenly to the electro-conductive layer 25.

Two terminals 44 and 45 at the top edge of the glass panel assembly serve to connect the two bus bars 36 and 37 to such external supply circuit.

The electrical connections to the two bus bars 36 and 37 are preferably made at one region of the glass panel, to simplify the electrical connections to the external circuit. An auxiliary bus bar strip 37–a is provided along one side edge of the front glass panel 31, to extend down to the input end of the lower bus bar 37. The two terminal leads 44 and 45 to the bus bars 36 and 37 may then be located closely adjacent for simplified connection to the external circuit through the control equipment, shown as a thermostatic assembly 50 in later figures.

In order to protect the bus bar strips 36 and 37, their outer edges are disposed and located to be spaced slightly inward from the adjacent contour edges 46 and 47 of the glass panel 31, on which the bus bar strips 36 and 37 are mounted.

In Figure 2, the bus bars 36 and 37 are viewed through the rear panel 32, and are under the rear panel as thus viewed, but they are visible and are therefore shown in solid line instead of in broken line. The outer longitudinal edges of the bus bar strips 36 and 37 also define the outer edges of the electro-conductive film 25. The locations of those outer edges are predetermined, as desired, by decoating or removing a narrow border strip of the film 25 along the top and bottom contour edge 46 and 47 of the glass panel 31, in any suitable manner, as by a grinding tool. Two narrow top and bottom border edge strips 51 and 52 of uncovered glass remain to define the top and bottom edges 53 and 54 of the film 25.

The borders at the two side contour edges 56 and 57 on the back surface of front panel 31 are similarly decoated to leave one narrow uncovered glass strip 55 along one side contour edge 56 and a narrow uncovered narrow glass strip 58 along the opposite side contour edge 57 of the front glass panel. In order to isolate the auxiliary connecting strip 37–a from the conductive film 25, a second strip of film is removed parallel to the side edge glass strip 58 in such manner as to leave an intermediate decoated glass strip 58–a between the connecting runner strip 37–a and the film 25. A metallic layer is then superimposed on such isolated connecting runner strip 37–a to enable it to serve as a connecting terminal strip to the lower bus bar 37. The runner strip 37–a is thus insulated from the conducting film 25 by the inner glass strip space 58–a. The terminal 44 then serves to connect the external circuit to the bus bar 37 through the connecting terminal strip 37–a.

The details of the sectional view taken along line 4—4 at the left-hand side of Figure 2 are shown greatly enlarged in Figure 4. The upper panel 31 is the front panel of the assembly and carries the electro-conductive layer film 25. The two decoated sections, or strips, from which the film has been removed, constitute the uncovered glass strip areas 58 and 58–a. The isolated conductive strip 25 between those two glass strip areas 58 and 58–a is covered with a layer of metal bonded thereto to constitute the connecting strip 37–a that leads to the lower or bottom bus strip 37. The space 33 between the two glass panels 31 and 32 is otherwise filled with the transparent cementitious binder 34.

In order that the two connecting leads of terminals 44 and 45 may be protected from unnecessary stress during handling of the window unit, or during assembling and positioning, the back glass panel 32 is provided with a shallow undercut or edge notch 61 to permit the connectors 44 and 45 to be folded over the thickness of the rear back panel 32, but under and within the virtual external top edge of that panel 32, as shown in the enlarged detail of Figure 3.

The location of the terminals 44 and 45 may be variously arranged, as desired, for convenient connection to the controlling thermostat assembly. The thermostats that are utilized herein employ a temperature-sensitive element to be placed against the back surface of the front panel 31. To provide access to the desired area, the rear panel 32 is cut out to leave a large edge notch cutout opening 29, as shown in Figure 2, to receive and accommodate the thermostat assembly.

Figures 2, 3 and 4 illustrate a window assembly in which only two glass panels are utilized. In some applications, where additional strength or heat insulation may be desired against the elements, three panels or more may be utilized. Two forms of a three-panel assembly are shown in subsequent Figures 5 to 10, inclusive, by way of example, as a basis for the detail description and explanation of the construction and disposition of the thermostat assembly and of the window assembly. As in the case of the two-panel window assembly of Figure 2, the three-panel window assembly in Figure 5, and following, is provided with intermediate layers of transparent vinyl cement, and all are tightly compressed, during manufacturing assembly, to form an integral transparent glass unit, with predetermined limited spacing in the vinyl spaces.

The disposition of the control thermostat assembly 50 may vary somewhat in different applications, according to the constructions and contour outline of the window panels. These window panels take on a variety of shapes and dimensions and contour outlines, since they must in many cases be fitted into spaces available after the main structure of a vessel has been designed.

As shown in Figures 5 and 7, a three-panel assembly 65 consists of three plate-glass panels 65–a, 65–b, 65–c, cemented together as an integral assembly with transparent vinyl cement 66 between adjacent panels. The front panel 65–a is provided with a body of electro-conducting film 67 on its back surface, surrounded by a decoated border 68. The two side border regions of the conducting film 67 are provided with low resistivity superposed metallic layers to serve as low-resistance bus bars 69 and 70.

Connections may be made, in one modification, as in Figure 5, through auxiliary connecting strips 69–a and 70–a as superposed layers on similar strips of the conducting film that have been suitably isolated from the main body of the conducting film 67 by decoated regions 71 and 71–a. Two terminals 73 and 74 serve to connect the auxiliary connecting strips 69–a and 70–a to an external circuit through associated control equipment, such as a thermostat. Space for the thermostat is provided by the cut-out spaces 75 and 76 in the middle and back panels 65–b and 65–c, respectively, as shown in Figures 5 and 7.

In the panel assembly modification shown in Figure 6, the front and intermediate panels may be similar to the arrangement shown in Figure 2, and the rear panel added to provide the additional insulation and strength. Alternately, the intermediate panel may be the thicker panel and the rear panel of thinner section, as in Figure 7. The space for the control thermostat will be provided by cut-outs in the intermediate and rear panels, as shown in Figure 7.

A preferred disposition of the thermostat on the window is shown in Figure 8. Since the thermostat assembly constitutes an obstruction in the area of observation, the thermostat is preferably disposed along a border area, to occupy a minimum of viewing space that would otherwise be available.

The thermostat is utilized to obtain a measure of a temperature at the front plane of the front window panel. The thermostat is preferably disposed in direct contact with the heated rear surface of the front window panel, although the temperature-detection area could be taken on a decoated part of the back surface of the front panel.

The thermostat assembly 50, disposed as shown in Figure 8, is shown in more detail in Figures 9 and 10. The thermostat assembly 50 comprises three contact thermostat units 81, 82 and 83, each having a metal casing or enclosure with a flat contact surface, respectively numbered 81–a, 82–a and 83–a, for seating directly against a selected surface area of film 67 on the back surface of the front glass panel 31. One unit 81 is shown in detail in Figure 11.

Each thermostat unit 81, 82 and 83, is seated on an associated compression biasing spring 81–b, 82–b and 83–b, respectively, to permit each thermostat to have a small but sufficient amount of resilient lost motion to enable the thermostat contact face to suitably adjust itself as may be necessary in seating against the back surface of film 67 of the front glass panel 31 to compensate for any variation in the dimensions of the thermostats.

Each thermostat unit, such as unit 81, is enclosed within a hermetically sealed casing, which has a front part 84 of metal of substantially cup shape, and a rear body part 85 of rubber of cup shape that is molded to the front metallic portion 84 in such manner as to establish a hermetic seal and to enclose the operating element of the thermostat. The operating element of the thermostat may be considered as a thermally operable switch, the details of which need not be shown. It is merely sufficient here to consider that the thermostat opens and closes a circuit at the limits of a differential temperature range.

The rubber body portion 85 is formed with an annular seating shoulder 85–a covered with a metal annular seating ring 85–b that is to serve as a seating element for the thermostat unit as a whole, while protecting the seating shoulder 85–a of the rubber casing 85 from excessive external pressures. The seating ring further serves to prevent the thermostat unit from moving through its guide opening.

The rubber casing 85 is also provided with an integrally formed outlet boss 85–d through which two conductors 81–c and 81–d proceed from the thermostat operating switch, within the case, to the outside of the case to serve as electrical terminals for connection to an external control circuit.

The manner in which the individual thermostat units are supported in the supporting and mounting bracket of the thermostat assembly 50 may now be considered, with reference to Figures 8, 9, 10 and 11. As there shown, the thermostat assembly 50 consists of a supporting box comprising a front guide strip 87 and a rear reaction strip 88, both of a suitable insulating material, preferably a rigid phenolic, such as Micarta. The front guide strip 87 is provided with three linearly spaced openings 89–a, 89–b and 89–c each of which receives and guides the formed metallic cup casing part 84 of a corresponding one of the three thermostat units 81, 82 and 83.

The front face of the rear reaction strip 88 is spaced behind the rear surface of the front guide strip 87 a sufficient distance to accommodate the rubber enclosure 85 of each of the three thermostat units, plus a small additional space 90 which serves to provide a lost motion space to enable each thermostat unit to adjust itself to its optimum seating position against the back surface of film 67 of front glass panel 31.

The rear reaction plate 88 is provided with three cylindrical cavities 91 and 92 and 93, co-axial with the respective thermostats, to receive and to seat and confine one end of the respective associated conical compression reaction springs 81–b, 82–b or 83–b, previously referred to. The compression springs bias the respective thermostat units into seating contact with the back surface of film 67 of the front glass panel 31.

An integral part-spherical boss 85–c on the back of the rubber casing 85 nests in the associated spring to hold its thermostat in relative co-axial alignment with the spring thrust.

Before the thermostat assembly is placed in position, the biassing spring 81–b presses the protective ring 85–b against the rear surface of the guide strip 87. After the assembly is placed in position, the seating of the thermostat face against the surface of glass panel 31 moves the thermostat back from the guide strip 87.

The front guide strip 87 and the rear reaction strip 88 are held in properly spaced relation by four cylindrical spacers 94, preferably of the same phenolic insulating material, and supported in position on forward shank portions 95–a of four supporting bolts 95.

The spacers 94 are slightly longer than the depth of the rubber casings 85 to provide the lost-motion space 90 between the rubber casings 85 and the rear surface of front guide strip 87 of the thermostat supporting structure.

Each supporting bolt for the spacers has a rear shank portion 95–b of normal diameter and a forward shank portion 95–a of slightly reduced diameter to provide a seating shoulder 95–c at the juncture to seat against the rim of its receiving hole in the reaction plate 88 through which the front shank portion 95–a extends. That front shank portion 95–a of each bolt extends through the spacer 94 and through a co-axially aligned hole in the front guide strip 87, to receive a lock-washer and lock-nut assembly 97 to lock the guide strip 87 and the reaction strip 88 together. The bolt 95 may be made of rod and provided, as here, with a snap ring 95–d.

The four lock-nut assemblies 97 compress the front guide strip 87 and the rear reaction strip 88 tightly against the seating shoulders of the bolts 95, with the cylindrical spacers 94 defining the separation between the two strips 87 and 88.

The three thermostat units are thus individually free so each may enjoy its own self-adjusting lost motion on its biassing spring 81–b, 82–b or 83–b. At the same time, all three thermostats are collectively supported to move as a group, with a limited amount of lost motion, by reason of the floating support of the front guide strip 87 and back reaction strip 88 as an integrated box structure, on four helical compression springs 99 that are individually slipped over the rear shanks 95–b of the supporting bolts 95.

Those compression springs 99 disposed on the bolts 95 seat against the back surface of the reaction strip 88 and against the front surface of the main bracket plate 100, through which the supporting bolts slidably extend to enjoy the lost motion permitted by the compression springs 99.

The main mounting bracket 100 serves also to support a terminal block 103 to which the outlet terminals from the three thermostats are respectively connected to be readily available to permit connection to an external supply circuit which will supply energy to the conducting film on the front glass panels. A suitable simple connection is made from the terminal block 103 to a plug connector 105 into which an external plug may be suitably inserted to supply the heating current from the external supply circuit.

The two thermostats 81 and 82 are self-resetting, on and off. The third thermostat 83 is not self-resetting, and stays in off or open position when actuated upon occurrence of excessive temperature. To reset thermostat 83 after such an operation, a re-set button 104 is provided, to operate a push-rod 104–a against the back wall of the thermostat rubber casing. The construction of the thermostat involves a thermally-responsive element that is held against self-resetting operation until restored by the push-rod. A biassing spring 104–b biasses the button away from the back wall of the thermostat, but permits the limited forward motion required to reset the thermostat.

The entire window assembly with the thermostat is shown supported in a mounting frame 110 that enables the entire window assembly to be handled as a unit and to be mounted on the main supporting structure 109 in suitable manner, as by the bolts 111. The mounting frame 110, as shown, consists of a mounting frame 112 and a front retaining frame 113.

A resilient gasket seal 114 enfolds the glass panel edges to protect the glass from impressed stresses of the frame, to seal the frame against moisture and to provide electrical insulation for the electro-conducting film on the front panel. Where the gasket seal folds over the area of the cut-out space for the thermostat assembly, a reinforcing strut 115 is utilized. Additional border strips are indicated by strips 116 and 117 at the outer borders between the mounting frame 112 and the retaining frame 113.

The metal strip 116 serves as a fulcrum strip for the fastening bolts to apply compression force against the strip 117 of compressible sealing material.

Actual operating results indicate that better control of the window temperature is achieved when close thermal coupling is maintained between the thermostat and the electro-conductive film. The temperature-responsive element of the commercial thermostat here used is enclosed in the front part 84 of the casing and is heated by conduction from the face of that front part 84. Thus, the thermostat itself is not directly in contact with the film 25. It is for that reason that the direct contact of he face of the thermostat case may be directly applied to the heated film.

As the ambient temperature at that exposed face of the front panel varies, the temperature gradient from the film to front exposed face changes, with a simultaneous effect on the thermostat, depending upon the coupling between the film and the thermostat. Thus, the thermostat may be positioned to provide an appropriate coupling to a heated zone to achieve the desired regulatory control of the temperature at the exposed face of the front glass panel.

The decoating operation around the border of the film serves primarily to self-insulate the electro-conductive film 25, except at a predetermined region where the terminal leads emerge. This permits assembling and placing of the front panel without requiring excessive care of the edges in handling the panel.

In the thermostat control circuitry, the two thermostats 81 and 82 operate in series, with one adjusted to do the actual regulation and the other adjusted to a nearby operating value as a back-up unit. This one thermostat will operate its switch to open the circuit under load, and the back-up unit will open under no load. The third thermostat is adjusted to open and stay open when the temperature rise indicates a faulty condition that requires examination and correction.

Thus, by means of the arrangement disclosed herein, the front window panel can be heated to such degree as may be necessary to heat the front exposed surface to a temperature above freezing, sufficient to prevent formation or accumulation of snow or ice on the window.

What is claimed is:

1. An automatically controlled electrically heated window, comprising: a laminated transparent structure consisting of (a) a front facing panel of plate glass having its front surface exposed to ambient conditions and having an electrically conducting transparent film on the back surface to heat said front panel; and (b) an insulating backing panel of structural plate glass having a notch or cut-out opening along one edge to expose a limited area of the conducting film on the back of the front panel; (c) a sealing layer of cementitious material between the two panels and serving to hold them together; means for supplying electrical energy to the conducting film of the back on the front panel; and thermostatic means directly engaging the conducting film on the back surface of the front panel exposed at said notch, and operative to control the supply of electrical energy to said conducting film to provide enough heat to prevent ice formation on the exposed front surface of the front panel.

2. An automatically controlled electrically heated window for use in climates with temperatures below freezing, said window comprising: a structural supporting frame; a front transparent glass panel supported in said frame to serve as a viewing window, whose front surface will be wiped by a suitable wiper to keep the front exposed surface free of accumulations of moisture or snow, the rear surface of the glass panel being covered by a transparent electro-conductive film; terminal conductors integral with the rear surface of the glass panel and serving to conduct heating electrical energy to the electro-conductive film; a structural rear transparent glass panel supported integrally with said front glass panel and hermetically sealed thereto to insulate the electro-conductive film on the back of the front panel, said rear panel being notched or cut out adjacent one edge to expose an area of the conducting film on the back surface of the front panel; and thermostat means engaging, and responsive to the temperature detected over said area of the film body of the front panel, by direct contact with said area, for controlling the supply of electrical heating energy to said conductive film.

3. An article of manufacture constituting an electrically heatable window for use in climates with temperatures below freezing, said window comprising: a front transparent glass panel, the back surface of said panel having two laterally spaced opposite border areas, each covered by an integrated electro-conductive metallic strip layer and both to serve as bus bars for connection to an external supply circuit, and said back surface constituting an integral transparent electro-conductive film electrically connected between the two bus bars and adapted to be energized from the bus bars to serve as a heating element for the front glass panel having a notch or cut-out adjacent one edge to expose a limited area of the conductive film on the back of the front panel; a rear transparent glass panel; a transparent cementitious layer of an organic vinyl compound sandwiched between the two glass panels to serve as a cement to hold the glass panels together; a thermostat seated against the exposed heated area of the film on the back surface of the front panel to control the supply of electrical energy to the bus bar strips for transmission to the film.

4. An article of manufacture constituting an electrically heatable window for use in climates with temperatures below freezing, said window comprising: a front transparent glass panel, the back surface of said panel having two laterally spaced opposite border areas, each covered by an integrated electro-conductive metallic strip layer and both to serve as bus bars for connection to an external supply circuit, and said back surface constituting an integral transparent electro-conductive film electrically connected between the two bus bars and adapted to be energized from the bus bars to serve as a heating element for the front glass panel; a rear transparent panel having a notch or cut-out adjacent one edge to expose a limited area of the conductive film on the back of the front panel; a transparent cementitious layer of an organic vinyl compound sandwiched between the two panels to serve as a cement to hold the glass panels together; and a thermostat seated against the exposed heated area of the film on the back surface of the front panel to control the supply of electrical energy to the bus bar strips for transmission to the film.

References Cited in the file of this patent

UNITED STATES PATENTS

| | | |
|---|---|---|
| 1,480,805 | Hadley et al. | Jan. 15, 1924 |
| 2,507,036 | McCrumm | May 9, 1950 |
| 2,513,993 | Burton | July 4, 1950 |
| 2,563,874 | Salton | Aug. 14, 1951 |
| 2,608,635 | Mershon | Aug. 26, 1952 |